United States Patent
Mandelli et al.

(10) Patent No.: US 12,439,290 B2
(45) Date of Patent: Oct. 7, 2025

(54) APPARATUS AND METHOD FOR SCHEDULING TRAFFIC

(71) Applicant: Nokia Solutions and Networks Oy, Espoo (FI)

(72) Inventors: Silvio Mandelli, Stuttgart (DE); Thorsten Wild, Stuttgart (DE)

(73) Assignee: Nokia Solutions and Networks Oy, Espoo (FI)

( * ) Notice: Subject to any disclaimer, the term of this patent is extended or adjusted under 35 U.S.C. 154(b) by 290 days.

(21) Appl. No.: 18/262,816

(22) PCT Filed: Jan. 27, 2022

(86) PCT No.: PCT/EP2022/051866
§ 371 (c)(1),
(2) Date: Jul. 25, 2023

(87) PCT Pub. No.: WO2022/162052
PCT Pub. Date: Aug. 4, 2022

(65) Prior Publication Data
US 2024/0098553 A1  Mar. 21, 2024

(30) Foreign Application Priority Data

Jan. 28, 2021 (FI) .................................... 20215093

(51) Int. Cl.
*G06F 15/16* (2006.01)
*H04L 47/10* (2022.01)
(Continued)

(52) U.S. Cl.
CPC ......... *H04W 28/0252* (2013.01); *H04L 47/39* (2013.01); *H04W 28/10* (2013.01)

(58) Field of Classification Search
CPC .... H04L 47/39; H04W 28/10; H04W 28/0252
(Continued)

(56) References Cited

U.S. PATENT DOCUMENTS 6,446,042 B1 * 9/2002 Detlef .................... G10L 15/30
704/E15.047
6,785,232 B1 8/2004 Kotser et al.
(Continued)

FOREIGN PATENT DOCUMENTS

WO 2011/053784 A1 5/2011
WO 2014/210221 A1 12/2014
(Continued)

OTHER PUBLICATIONS

"3rd Generation Partnership Project; Technical Specification Group Services and System Aspects; System architecture for the 5G System (5GS); Stage 2 (Release 16)", 3GPP TS 23.501, V16.5.1, Aug. 2020, pp. 1-440.
(Continued)

*Primary Examiner* — Moustafa M Meky
(74) *Attorney, Agent, or Firm* — Nokia Technologies Oy

(57) ABSTRACT

Disclosed is an apparatus comprising means for: detecting an occurrence of a traffic burst event on a flow within a wireless network; responsive to the detection of the occurrence of a traffic burst event, determining whether a traffic burst allowance is available; responsive to determining that the traffic burst allowance is available, scheduling the flow and/or another flow within the wireless network with a traffic burst bit rate at which to transmit data, the traffic burst bit rate being greater than a first, guaranteed bit rate indicated by an assigned quality of service for the flow; and responsive to determining that the traffic burst allowance has been exhausted and/or determining that occurrence of the traffic burst event has stopped, scheduling the flow with the first bit rate.

20 Claims, 9 Drawing Sheets

(51) Int. Cl.
  *H04W 28/02* (2009.01)
  *H04W 28/10* (2009.01)
(58) Field of Classification Search
  USPC .......................................................... 709/238
  See application file for complete search history.

(56) References Cited

U.S. PATENT DOCUMENTS

| | | | | |
|---|---|---|---|---|
| 7,130,937 | B2* | 10/2006 | Hwang | H04N 21/658 |
| | | | | 710/52 |
| 8,139,513 | B2* | 3/2012 | Nakayasu | H04W 72/543 |
| | | | | 370/310.1 |
| 8,483,702 | B2 | 7/2013 | Noriega et al. | |
| 8,755,405 | B2 | 6/2014 | Kovvali et al. | |
| 9,191,859 | B2* | 11/2015 | Zakrzewski | H04W 28/10 |
| 11,202,222 | B2* | 12/2021 | Joseph | H04W 28/0268 |
| 11,463,918 | B2* | 10/2022 | Xin | H04W 76/12 |
| 11,627,493 | B2* | 4/2023 | Rost | H04L 43/028 |
| | | | | 370/229 |
| 11,689,940 | B2* | 6/2023 | Wang | G06N 3/044 |
| | | | | 706/25 |
| 11,886,991 | B2* | 1/2024 | Wang | G06N 3/02 |
| 11,950,124 | B2* | 4/2024 | Chen | H04W 28/0263 |
| 12,236,347 | B2* | 2/2025 | Wang | G06N 3/08 |
| 2005/0033879 | A1* | 2/2005 | Hwang | H04L 47/29 |
| | | | | 710/52 |
| 2007/0121504 | A1 | 5/2007 | Hellenthal et al. | |
| 2008/0186942 | A1* | 8/2008 | Nakayasu | H04W 72/12 |
| | | | | 370/345 |
| 2008/0225711 | A1 | 9/2008 | Raszuk et al. | |
| 2013/0294241 | A1* | 11/2013 | Zakrzewski | H04W 28/10 |
| | | | | 370/235 |
| 2014/0050147 | A1* | 2/2014 | Beale | H04M 15/8027 |
| | | | | 370/328 |
| 2019/0253917 | A1 | 8/2019 | Dao | |
| 2020/0137615 | A1* | 4/2020 | Joseph | H04W 48/06 |
| 2020/0236578 | A1 | 7/2020 | Cakulev et al. | |
| 2021/0014739 | A1* | 1/2021 | Xin | H04W 28/0268 |
| 2021/0158151 | A1* | 5/2021 | Wang | H04W 4/06 |
| 2021/0168646 | A1* | 6/2021 | Chen | H04W 28/10 |
| 2021/0182658 | A1* | 6/2021 | Wang | G06N 3/02 |
| 2021/0204172 | A1* | 7/2021 | Rost | H04L 43/026 |
| 2021/0219168 | A1* | 7/2021 | Liu | H04W 28/0205 |
| 2024/0135175 | A1* | 4/2024 | Wang | H04L 12/189 |
| 2025/0190791 | A1* | 6/2025 | Wang | G06N 3/04 |

FOREIGN PATENT DOCUMENTS

| | | |
|---|---|---|
| WO | 2019/217530 A1 | 11/2019 |
| WO | 2019/218916 A1 | 11/2019 |
| WO | 2020/029196 A1 | 2/2020 |

OTHER PUBLICATIONS

"Fixed Wireless Access With 5G at Mid-Bands", Nokia White Paper, 2020, pp. 1-20.

Tsilimantos et al., "Traffic profiling for mobile video streaming", IEEE International Conference on Communications (ICC), May 21-25, 2017, 7 pages.

Lam et al., "Burst scheduling: architecture and algorithm for switching packet video", Proceedings of Infocom'95, Apr. 2-6, 1995, pp. 940-950.

Farzanegan et al., "A Scheduling Algorithm for Bursty Traffic: Controlling of Service Rate and Burst", Arabian Journal for Science and Engineering, vol. 39, 2014, pp. 4753-4764.

Andrews et al., "Optimal utility based multi-user throughput allocation subject to throughput constraints", Proceedings IEEE 24th Annual Joint Conference of the IEEE Computer and Communications Societies, Mar. 13-17, 2005, pp. 2415-2424.

Mandelli et al., "Satisfying network slicing constraints via 5G MAC scheduling", IEEE Conference on Computer Communications, Apr. 29-May 2, 2019, pp. 2332-2340.

Proebster et al., "Context-aware resource allocation for cellular wireless networks", Eurasip Journal on Wireless Communications and Networking, Article No. 216, 2012, pp. 1-19.

"5G; Policy and charging control framework for the 5G System (5GS); Stage 2 (3GPP TS 23.503 version 16.5.0 Release 16)", ETSI TS 123 503, V16.5.0, Jul. 2020, 120 pages.

"5G NR QoS Parameters", Techplayon, Retrieved on Sep. 2, 2023, Webpage available at : https://www.techplayon.com/5g-nr-qos-parameters/.

Proebster et al., "Context-aware resource allocation to improve the quality of service of heterogeneous traffic", IEEE International Conference on Communications (ICC), Jun. 5-9, 2011, 6 pages.

Office action received for corresponding Finnish Patent Application No. 20215093, dated Jun. 10, 2021, 8 pages.

"5G; System architecture for the 5G System (5GS) (3GPP TS 23.501 version 16.7.0 Release 16)", ETSI TS 123 501, V16.7.0, Jan. 2021, 452 pages.

International Search Report and Written Opinion received for corresponding Patent Cooperation Treaty Application No. PCT/EP2022/051866, dated May 18, 2022, 11 pages.

Office action received for corresponding Finnish Patent Application No. 20215093, dated Jun. 21, 2022, 7 pages.

* cited by examiner

APPARATUS AND METHOD FOR SCHEDULING TRAFFIC

RELATED APPLICATION

This application claims priority to PCT Patent Application No. PCT/EP2022/051866, filed Jan. 27, 2022, which claims priority to FI Patent application No. 20215093, filed Jan. 28, 2021, which is incorporated herein by reference in its entirety.

FIELD

Embodiments relate to scheduling techniques and quality of service (QoS) management in wireless communications networks.

BACKGROUND

In recent years, demand for high bandwidth internet services has increased. For instance, in some urban areas, peak speeds of 100 Mb/s or more are in high demand and gigabit services are becoming more commonplace. Traditional fixed access solutions using fibre, copper or coax can generally support these speeds.

Some modern, wireless radio access networks (RAN), such as 5G, can now also support these speeds. As such, fixed Wireless Access (FWA), for instance using 5G, can be provided as an alternative to traditional fixed access solutions. In addition, FWA may have the benefit of being quick to rollout and having reduced complexity of installation of Customer Premises Equipment (CPE). With increased deployment of FWA, the demand for (e.g. high-definition) video streaming on RAN may also increase.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, there is described an apparatus comprising means for: detecting an occurrence of a traffic burst event on a flow within a wireless network; responsive to the detection of the occurrence of a traffic burst event, determining whether a traffic burst allowance is available; responsive to determining that the traffic burst allowance is available, scheduling the flow and/or another flow within the wireless network with a traffic burst bit rate at which to transmit data, the traffic burst bit rate being greater than a first, guaranteed bit rate indicated by an assigned quality of service for the flow; and responsive to determining that the traffic burst allowance has been exhausted and/or determining that occurrence of the traffic burst event has stopped, scheduling the flow with the first bit rate.

The apparatus may comprise means for receiving traffic burst allowance information indicative of a maximum size of an amount of data which can be transmitted at the traffic burst bit rate before the traffic burst allowance is exhausted.

The apparatus may comprise means for receiving traffic burst allowance information indicative of the traffic burst bit rate. Additionally or alternatively, the apparatus may comprise means for calculating the traffic burst bit rate.

The apparatus may comprise means for receiving traffic burst allowance information indicative of a recovery time, wherein the amount of data which can be transmitted at the traffic burst bit rate before the traffic burst allowance is exhausted may be reset to a maximum value after an amount of time indicated by the recovery time has passed since traffic burst bit rate was last scheduled. The apparatus may comprise means for receiving traffic burst allowance information indicative of a recovery speed, wherein the amount of data which can be transmitted at the traffic burst bit rate before the traffic burst allowance is exhausted may recover at a rate indicated by the recovery speed up to a maximum value. The apparatus may comprise means for receiving traffic burst allowance information indicative of a priority index of data transmitted at the traffic burst bit rate, the priority index of data transmitted at the traffic burst bit rate may be higher than a priority index for data transmitted at the first bit rate.

The apparatus may comprise means for monitoring available credit associated with transmission at the first bit rate, wherein detecting the occurrence of the traffic burst event on the flow may be based at least in part on determining that there is no credit associated with transmission at the first bit rate, wherein available credit may be indicative of an amount of data which can be transmitted at a particular bit rate.

The apparatus may comprise means for detecting the occurrence of the traffic burst event on the flow based on receipt of a traffic burst signal flag associated with data to be transmitted at the traffic burst bit rate.

The apparatus may comprise means for tracking an input buffer rate of received data; and detecting the occurrence of the traffic burst event on the flow based on determining that the tracked input buffer rate is above a predefined threshold.

Determining that the traffic burst allowance is available may be based on determining that there is credit associated with the traffic burst allowance, wherein determining that the traffic burst allowance has been exhausted and/or is not available may be based on determining that there is no credit associated with the traffic burst allowance, and wherein available credit associated with the traffic burst allowance may be indicative of an amount of data which can be transmitted at the traffic burst bit rate before the traffic burst allowance is exhausted.

The apparatus may comprise means for, iteratively for plural time transmission intervals: adding credit associated with transmission at the traffic burst bit rate and/or the traffic burst allowance based on the duration of the time of a transmission interval and the traffic burst bit rate; and removing credit associated with transmission at the traffic burst bit rate and/or the traffic burst allowance based on the amount of data transmitted during the time transmission interval.

The apparatus may comprise means for determining that the rate of transmitting data violates the traffic burst bit rate when there is at least one of: no credit associated with transmission at the traffic burst bit rate, and no credit associated with the traffic burst allowance.

The apparatus may comprise means for: responsive to at least one of determining that the burst allowance has been exhausted, determining that the burst allowance is not available, and determining that the rate of transmitting data violates the traffic burst bit rate: determining not to schedule the flow and/or another flow within the wireless network with the traffic burst bit rate.

The apparatus may comprise means for scheduling the another flow with the traffic burst bit rate, wherein scheduling the another flow with the traffic burst bit rate may comprise redirecting the data for transmission to the another flow, the another flow having the traffic burst bit rate.

The scheduling may be performed by a MAC scheduler.

The apparatus may comprise means for scheduling the another flow with the traffic burst bit rate, wherein the data for transmission may be associated with a unique flow, and wherein scheduling the flow with the first bit rate may comprise allocating the data to a first flow, and scheduling the another flow with the traffic burst bit rate may comprise allocating the data to a second flow, wherein the first flow may have the first bit rate and the second flow may have the traffic burst bit rate.

The scheduling may be performed by a protocol stack layer higher than a MAC scheduler.

The apparatus may comprise means for receiving context information; and modifying the traffic burst allowance based on the context information. Modifying the traffic burst allowance based on the context information may comprise at least one of resetting the traffic burst allowance to a maximum traffic burst allowance, and increasing the maximum traffic burst allowance. The context information may comprise at least one of a channel condition, and proximity to a coverage hole in the network.

The network may be a fixed wireless access network.

The apparatus may be configured for scheduling transmission of data with an adaptive video streaming flow, wherein the flow and/or the another flow may be an adaptive video streaming flow.

According to a second aspect, there is described a method comprising: detecting an occurrence of a traffic burst event on a flow within a wireless network; responsive to the detection of the occurrence of a traffic burst event, determining whether a traffic burst allowance is available; responsive to determining that the traffic burst allowance is available, scheduling the flow and/or another flow within the wireless network with a traffic burst bit rate at which to transmit data, the traffic burst bit rate being greater than a first, guaranteed bit rate indicated by an assigned quality of service for the flow; and responsive to determining that the traffic burst allowance has been exhausted and/or determining that occurrence of the traffic burst event has stopped, scheduling the flow with the first bit rate.

The method may comprise receiving traffic burst allowance information indicative of a maximum size of the amount of data which can be transmitted at the traffic burst bit rate before the traffic burst allowance is exhausted.

The method may comprise receiving traffic burst allowance information indicative of the traffic burst bit rate. Additionally or alternatively, The method may comprise calculating the traffic burst bit rate.

The method may comprise receiving traffic burst allowance information indicative of a recovery time, wherein the amount of data which can be transmitted at the traffic burst bit rate before the traffic burst allowance is exhausted may be reset to a maximum value after an amount of time indicated by the recovery time has passed since traffic burst bit rate was last scheduled. The method may comprise receiving traffic burst allowance information indicative of a recovery speed, wherein the amount of data which can be transmitted at the traffic burst bit rate before the traffic burst allowance is exhausted may recover at a rate indicated by the recovery speed up to a maximum value. The method may comprise receiving traffic burst allowance information indicative of a priority index of data transmitted at the traffic burst bit rate, the priority index of data transmitted at the traffic burst bit rate may be higher than a priority index for data transmitted at the first bit rate.

The method may comprise monitoring available credit associated with transmission at the first bit rate, wherein detecting the occurrence of the traffic burst event on the flow may be based at least in part on determining that there is no credit associated with transmission at the first bit rate, wherein available credit may be indicative of an amount of data which can be transmitted at a particular bit rate.

The method may comprise detecting the occurrence of the traffic burst event on the flow based on receipt of a traffic burst signal flag associated with the data to be transmitted at the traffic burst bit rate.

The method may comprise tracking an input buffer rate of received data; and detecting the occurrence of the traffic burst event on the flow based on determining that the tracked input buffer rate is above a predefined threshold.

Determining that the traffic burst allowance is available may be based on determining that there is credit associated with the traffic burst allowance, wherein determining that the traffic burst allowance has been exhausted and/or is not available may be based on determining that there is no credit associated with the traffic burst allowance, and wherein available credit associated with the traffic burst allowance may be indicative of an amount of data which can be transmitted at the traffic burst bit rate before the traffic burst allowance is exhausted.

The method may comprise, iteratively for plural time transmission intervals: adding credit associated with transmission at the traffic burst bit rate and/or the traffic burst allowance based on the duration of the time of a transmission interval and the traffic burst bit rate; and removing credit associated with transmission at the traffic burst bit rate and/or the traffic burst allowance based on the amount of data transmitted during the time transmission interval.

The method may comprise determining that the rate of transmitting data violates the traffic burst bit rate when there is at least one of: no credit associated with transmission at the traffic burst bit rate, and no credit associated with the traffic burst allowance.

The method may comprise: responsive to at least one of determining that the burst allowance has been exhausted, determining that the burst allowance is not available, and determining that the rate of transmitting data violates the traffic burst bit rate: determining not to schedule the flow and/or another flow within the wireless network with the traffic burst bit rate.

The method may comprise scheduling the another flow with the traffic burst bit rate, wherein scheduling the another flow with the traffic burst bit rate may comprise redirecting the data for transmission to the another flow, the another flow having the traffic burst bit rate.

The scheduling may be performed by a MAC scheduler.

The method may comprise scheduling the another flow with the traffic burst bit rate, wherein the data for transmission may be associated with a unique flow, and wherein scheduling the flow with the first bit rate may comprise allocating the data to a first flow, and scheduling the another flow with the traffic burst bit rate may comprise allocating the data to a second flow, wherein the first flow may have the first bit rate and the second flow may have the traffic burst bit rate.

The scheduling may be performed by a protocol stack layer higher than a MAC scheduler.

The method may comprise receiving context information; and modifying the traffic burst allowance based on the context information. Modifying the traffic burst allowance based on the context information may comprise at least one of resetting the traffic burst allowance to a maximum traffic burst allowance, and increasing the maximum traffic burst allowance. The context information may comprise at least one of a channel condition, and proximity to a coverage hole in the network.

The network may be a fixed wireless access network.

The method may be configured for scheduling transmission of data with an adaptive video streaming flow, wherein the flow and/or the another flow may be an adaptive video streaming flow.

According to a third aspect, there is described a computer program product comprising a set of instructions which, when executed on an apparatus, cause the apparatus to carry out the method of any method definition of the second aspect.

According to a fourth aspect, there is described a non-transitory computer readable medium comprising program instructions stored thereon for performing a method comprising: detecting an occurrence of a traffic burst event on a flow within a wireless network; responsive to the detection of the occurrence of a traffic burst event, determining whether a traffic burst allowance is available; responsive to determining that the traffic burst allowance is available, scheduling the flow and/or another flow within the wireless network with a traffic burst bit rate at which to transmit data, the traffic burst bit rate being greater than a first, guaranteed bit rate indicated by an assigned quality of service for the flow; and responsive to determining that the traffic burst allowance has been exhausted and/or determining that occurrence of the traffic burst event has stopped, scheduling the flow with the first bit rate.

The program instructions of the fourth aspect may also perform operations according to any method definition of the second aspect.

According to a fifth aspect, there is described an apparatus comprising: at least one processor; and at least one memory including computer program code which, when executed by the at least one processor, causes the apparatus to: detect an occurrence of a traffic burst event on a flow within a wireless network; responsive to the detection of the occurrence of a traffic burst event, determine whether a traffic burst allowance is available; responsive to determining that the traffic burst allowance is available, schedule the flow and/or another flow within the wireless network with a traffic burst bit rate at which to transmit data, the traffic burst bit rate being greater than a first, guaranteed bit rate indicated by an assigned quality of service for the flow; and responsive to determining that the traffic burst allowance has been exhausted and/or determining that occurrence of the traffic burst event has stopped, schedule the flow with the first bit rate.

The computer program code of the fifth aspect may also cause performance of operations according to any method definition of the second aspect.

In another aspect, there is described an apparatus comprising means for: receiving traffic burst allowance information; based on the traffic burst allowance information, determining that a traffic burst allowance is available; and scheduling transmission of a traffic burst on a flow within a wireless network at a traffic burst bit rate, the traffic burst bit rate being higher than a first bit rate indicated by an assigned quality of service for the flow.

In another aspect, there is described an apparatus comprising means for: receiving traffic burst allowance information; and scheduling transmission of a traffic burst on a flow within a wireless network at a traffic burst bit rate determined based on the traffic burst allowance information, the traffic burst bit rate being higher than a first bit rate indicated by an assigned quality of service for the flow.

In another aspect, there is described an apparatus comprising means for: transmitting traffic burst allowance information associated with scheduling of traffic bursts on a flow within a network at a traffic burst bit rate, the traffic burst bit rate being higher than a first bit rate indicated by an assigned quality of service for the flow, wherein the traffic burst allowance information is indicative of at least one of: that traffic burst functionality is enabled for the flow, a traffic burst allowance size, a traffic burst bit rate, a recovery time of the traffic burst allowance, a recovery speed of the traffic burst allowance, and a priority index assigned to traffic bursts.

BRIEF DESCRIPTION OF THE DRAWINGS

Example embodiments will now be described by way of non-limiting examples, with reference to the accompanying drawings, in which.

DETAILED DESCRIPTION

Figure 1:
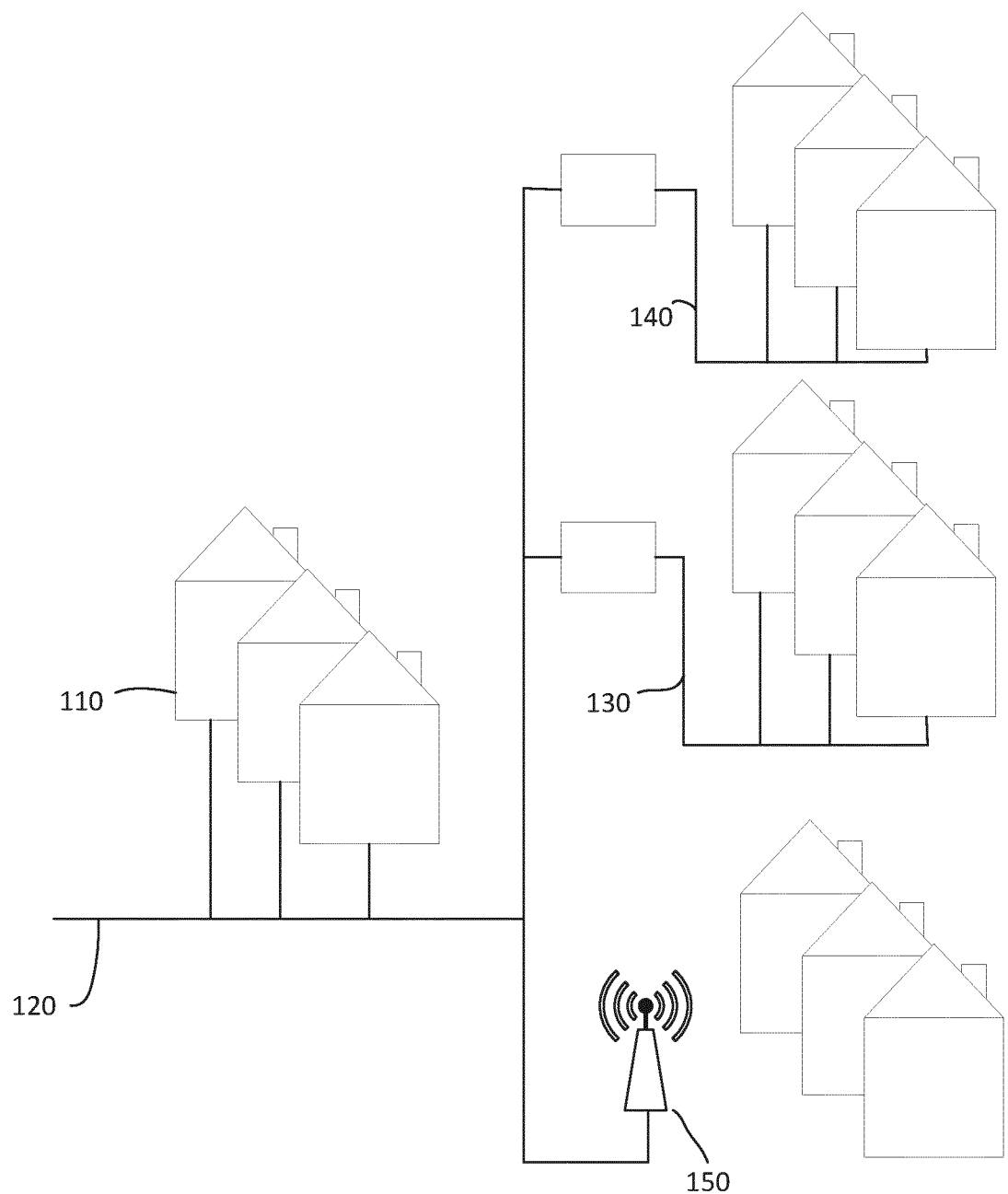
FIG. 1 illustrates examples of wired and wireless telecommunications systems.

In the description and drawings, like reference numerals refer to like elements throughout.

FIG. 1 illustrates examples of wired and wireless telecommunication systems. For instance, FIG. 1 may represent an example of how wired and wireless telecommunications technologies may be combined to provide ubiquitous broadband coverage.

As shown in FIG. 1, residences and other types of buildings 110 may be provided with an internet connection via various technologies. These technologies may include traditional fixed access solutions, such as fibre 120, copper 140, and coax 150. Some or all of the traditional fixed access solutions may be capable of providing internet speeds in excess of 100 Mb/s, and in some cases reaching and exceeding gigabit speeds.

As also shown in FIG. 1, an internet connection may be provided to residences and other types of buildings 110 with fixed wireless access (FWA) 150. Modern systems, for instance, those making use of 5G technologies, may be capable of providing internet speeds comparable to those of traditional fixed access solutions.

Figure 2:
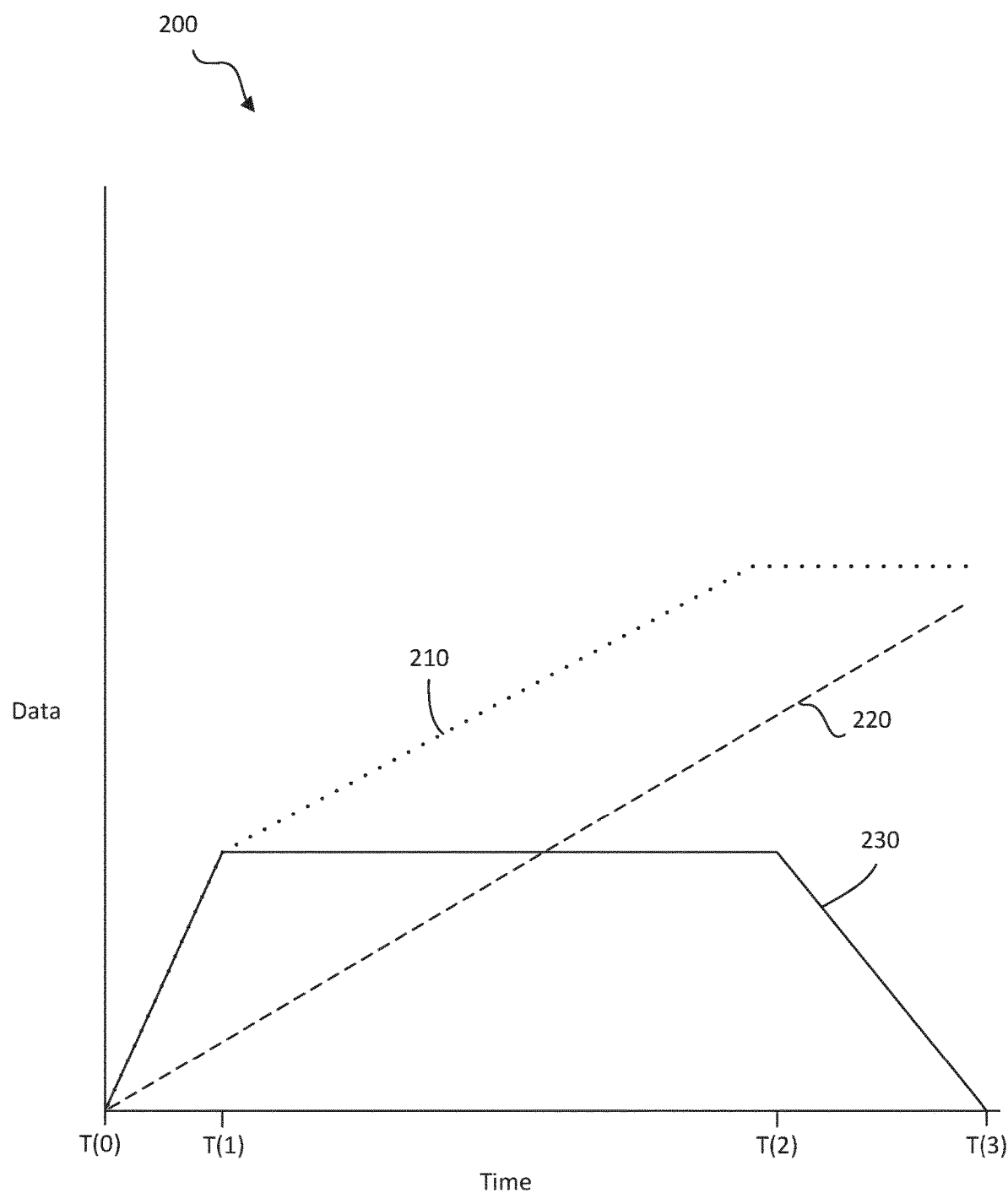
FIG. 2 illustrates an example of data usage over time during adaptive video streaming.

FIG. 2 illustrates an example of data usage over time during adaptive video streaming.

As shown in FIG. 2, graph 200 illustrates a plot of the cumulative data transferred during adaptive video streaming with dotted line 210, a plot of the cumulative data played during adaptive video streaming with dashed line 220, and a plot of the data buffered during adaptive video streaming with solid line 230.

In some video streaming protocols, for instance HTTP Adaptive Streaming (HAS), there may be an initial burst of data where the client device requests maximum throughput to quickly fill a buffer to a certain level. This may be performed in a time period denoted as the filling phase. The filling phase may be illustrated in FIG. 2 with dotted line 210 having a steep incline between time T(0) and T(1), indicating that the required bit rate may be relatively high. As also shown in FIG. 2, solid line 230 increases over time T(0) to T(1) indicating that the buffer is being filled.

An example of HAS is described in "Traffic profiling for mobile video streaming", D. Tsilimantos, et al.

Once this level is reached, the client device may match its requested streaming rate to the video encoding rate. This may be performed in a time period denoted as a steady-state phase. The steady-state phase may be illustrated in FIG. 2 with dotted line 210 having a reduced incline between time T(1) and T(2), indicating that the required bit rate may be relatively lower than that required in the filling phase. As also shown in FIG. 2, solid line 230 is substantially steady over time T(1) and T(2), indicating that the amount of data in the buffer may be substantially steady in the steady-state phase.

In a final phase, the buffer may contain data sufficient to conclude the adaptive video streaming. As shown in FIG. 2, dotted line 210 has levelled off in time period T(2) to T(3), indicating that no further data may be being transmitted. As also shown in FIG. 2, solid line 230 decreases in time period T(2) to T(3), indicating that the remaining data in the buffer is gradually being output.

As shown in FIG. 2, dashed line 220 has a generally steady incline across the phases. This may indicate that a user viewing output of an adaptive video stream may be provided with a consistent quality of experience (QoE) across the phases.

Figure 3:
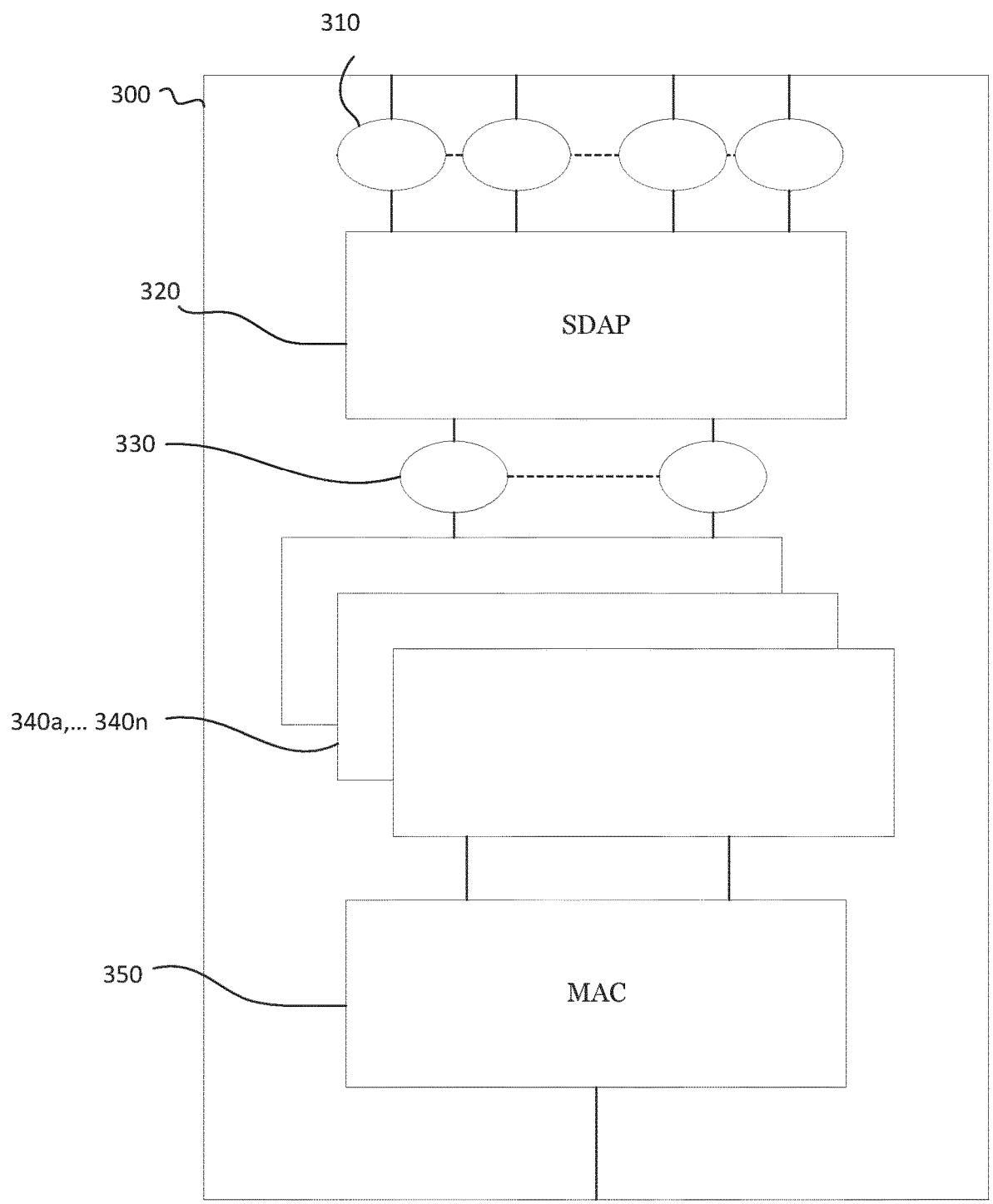
FIG. 3 illustrates an example of a protocol stack which may be used in some wireless internet technologies.

FIG. 3 illustrates an example of a protocol stack which may be used in some wireless internet technologies.

As shown in FIG. 3, some wireless internet technologies, for instance 5G technologies, may involve the use of a protocol stack 300. Protocol stack 300 may include a plurality of layers 320, 340a, . . . 340n, 350. For instance, protocol stack 300 may include a service data adaptation protocol (SDAP) layer 320. The SDAP layer 320 may interface with one or more quality of service (QoS) flows 310 and/or one or more data radio bearers (DRB) 330. For instance, the SDAP layer 320 may map one or more QoS flows 310 to one or more DRBs. Additionally or alternatively, protocol stack 300 may include a media access control (MAC) layer. Protocol stack 300 may also include one or more other layers 340a, . . . 340n, which are not described in detail here. These may include, for instance, a packet data convergence protocol (PDCP) layer, a radio link control (RLC) layer, and/or a physical layer.

As mentioned above, it may be desirable to quickly convey an initial burst of required data in order to satisfy a desired Quality of Experience (QoE) of adaptive video streaming. This may be facilitated by a scheduler of the involved networks. For instance, the scheduler may be configured to allocate resources to flows, which may also be referred to as data flows. Flows may include, for instance, active users, QoS flows, logical channels (LCH) and/or Data Radio Bearers (DRB). The flows may be used during uplink or downlink communication. The scheduler may schedule resources to a flow depending on its assigned Quality of Service (QoS), current achievable rate, transmission buffer status and/or previous scheduling history.

An example of such scheduling techniques which can perform these operations is described in "Satisfying network slicing constraints via 5G MAC scheduling.", Mandelli, Silvio, et al.

In some known techniques, video streaming services may be served with a minimum bit rate and a latency target QoS. However, in these techniques, initial traffic burst support may not be supported. An example of a QoS requirement is described in "TS 23.501 System architecture for the 5G system", 3GPP which is hereby incorporated by reference in its entirety.

"TS 23.501 System architecture for the 5G system" defines a Maximum Data Burst Volume (MDBV). The MDBV is provided for delay-critical guaranteed bit rate (GBR) services, and defines the largest amount of data that an access network is required to serve within a period of a Packet Delay Budget (PDB). In other words, the MDBV limits the maximum packet dimension which may be conveyed within the PDB, if a flow's rate is respecting an agreed GBR. However, the MDBV does not facilitate serving of initial bursts of video traffic.

As such, it may be useful to provide a scheduler configured to enable flows, for instance active users, QoS flows, Data Radio Bearers (DRB), and/or logical channels (LCH), which are tailored for adaptive video streaming. Specifically, it may be useful to provide a scheduler which can facilitate short, rare and high-rate traffic bursts and then steady data streaming at a lower rate. It may also be useful to provide a framework by which flows can signal one or more parameters (e.g. QoS) in relation to short, rare and high rate traffic bursts.

In addition, with the deployment of Fixed Wireless Access (FWA) services, high-resolution video traffic will be increasingly carried by wireless access networks. This includes traffic, which may have been previously carried by fixed access networks, and now may be handled by wireless networks (such as 5G). The provision of a scheduler and/or framework configured as described above may therefore help to preserve the end user quality of experience (QoE). Similarly, legacy scenarios of adaptive video streaming with mobile devices in typical cellular networks may also benefit from a scheduler and/or framework configured as mentioned above.

Various implementations of the technology disclosed herein describe scheduling techniques and quality of service (QoS) management. The disclosed techniques may be particularly beneficial in video streaming use cases which may involve handling infrequent (and typically) initial traffic bursts together with a relatively steady data stream. In other words, various implementations of the technology disclosed herein describe a scheduler that may be able to both enforce high-rate bursts of traffic and guaranteed bit rates for the same flow, and a framework by which a flow can signal one or more parameters (e.g. QoS) in relation to the high rate bursts of traffic.

In this way, by allowing adaptive data (e.g. video) streaming to quickly initialize and recover from interruptions, the streaming QoE may be improved.

In some examples, operations of the scheduler may be performed in the MAC layer 350, i.e. with a MAC scheduler. In other examples, operations of the scheduler may be performed in one or more layers higher than the MAC layer

350. For instance, operations of the scheduler may be performed in the SDAP layer 320. In this way, a higher traffic burst bit rate may be facilitated in a way that is transparent for the MAC scheduler, and modifications to standard signals may not be required.

It will be appreciated that whilst the description of the technology disclosed herein may generally refer to 3gpp terminology, specifically in relation to 5G, the technology disclosed herein may be used with any wireless communication standard.

Events which preferably result in initial traffic bursts or high-rate bursts of traffic may be referred to as traffic burst events. The initial traffic bursts or high-rate bursts of traffic may be enforced by a traffic burst allowance (TBA). The TBA may be associated with a TBA bit rate which is higher than an agreed bit rate. For instance, the bit rate may be agreed by virtue of being indicated by a QoS assigned for a flow. For instance, the agreed bit rate may be a GBR, a guaranteed flow bit rate (GFBR), or a minimum bit rate. A GBR may be a bit rate that is guaranteed to be provided by the network to a flow (e.g. an active user, a QoS flow, a DRB, a LCH) over a pre-set time interval. Similarly, a GFBR may be a bit rate that is guaranteed to be provided by the network to a QoS flow over a pre-set time interval. Additionally or alternatively, the agreed bit rate may be a maximum bit rate (MBR) or a maximum flow bit rate (MFBR). An MBR may be a maximum bit rate which is expected by a flow. In this case, optionally, excess traffic may be discarded or delayed by e.g. a rate shaping or policing function at a user equipment (UE), radio access network (RAN), and/or user plane function (UPF). Similarly, a MFBR may be a maximum bit rate which is expected by a QoS flow. In some examples, the TBA bit rate for a flow may be higher than both the GFBR and the MFBR (or GBR and MBR) for the flow (e.g. as indicated by an assigned QoS for the flow). The TBA bit rate may be pre-defined, and may be fixed or variable. In some examples, the TBA bit rate may be indicated and/or signalled by TBA information. The TBA information may be received, by the scheduler, from the flow. Transmission at the TBA bit rate may be temporary. For instance, the amount of time at which the higher bit rate is used and/or the amount of data which is transmitted at the higher bit rate may be limited by the TBA.

As will be appreciated, the TBA bit rate may be a guaranteed (or minimum) bit rate for a traffic burst which is higher than a guaranteed (or minimum) bit rate ordinarily assigned for the flow (e.g. when a traffic burst is not being provided/scheduled).

The traffic burst event may be, for instance, an initial burst of data to quickly fill a buffer to a certain level during adaptive video streaming. This may occur when the adaptive video streaming is initially started and/or restarted after a pause or interruption.

Additionally or alternatively, as another example, the traffic burst event may be a transmission of an error and/or failure message (and/or a request of such a transmission). This may occur as a result of an error or failure in a component involved in the transmission, for instance, a video stream provider. This may allow a relatively faster transmission of an error and/or failure message, as enforced by the TBA. For instance, if some flows usually operate with constant speed (or bitrate), faster transmission if anything goes wrong may be beneficial (for instance, for an application associated with a flow).

It will be appreciated that these are just two examples of traffic burst events, and that the disclosed technology may be utilised in any scenario in which it would be beneficial or otherwise desirable to temporarily allow higher bit rates.

TBA information may be associated with some types of flows, for instance, the types of flows which may carry video streaming traffic. The types of flows may be defined in relation to a required QoS. A GFBR associated with a type of flow may also be provided in the required QoS. For instance, an example of types of flows which are associated with a QoS is described in "TS 23.501 System architecture for the 5G system". The TBA information may be provided in the required QoS. For instance, the TBA information may be added for some or all of the 5G QoS indicators (5QI) described in "TS 23.501 System architecture for the 5G system".

The TBA information may include a maximum burst size. The maximum burst size may be indicative of a maximum amount of data which can be transmitted at the TBA bit rate before returning to a lower rate such as the GFBR. This may help to ensure that a flow is not scheduled with the TBA bit rate continuously.

The TBA information may also or alternatively include a burst recovery time. The burst recovery time may be a minimum time that should pass between one burst at the TBA bit rate and a following burst at the TBA bit rate from the same flow. Additionally or alternatively, the TBA information may include a TBA recovery speed. The TBA recovery speed may be the rate of recovery of data which may be transmitted at the TBA bit rate. Both the burst recovery time and the TBA recovery speed may help to ensure that the instances of scheduling a flow with the TBA bit rate are relatively infrequent.

The TBA information may also or alternatively define a TBA bit rate. The TBA bit rate may be the guaranteed bit rate at which the traffic burst will be transmitted. The TBA bit rate may be higher than the GFBR. The TBA information may also or alternatively include a TBA priority. The TBA priority may be a priority index for the traffic burst. In some examples, the traffic burst may be served with a higher priority index than traffic during normal (i.e. non traffic burst) data transmission periods.

Some or all of the TBA information may be provided as default values. Additionally or alternatively, some or all of the TBA information may be set for a given flow. For instance, the set TBA information may override the default values.

One or more layers in a protocol stack 300 may handle the TBA information. For instance, one or more layers in the protocol stack 300 may perform scheduling operations. The scheduling operations may include scheduling a flow with a GFBR policy during normal data transmission periods. The scheduling operations may also include, responsive to a burst traffic event and the TBA being available, scheduling the flow with a rate higher than GFBR (i.e. the TBA bit rate), until the burst is completely served or the burst allowance is exhausted.

The TBA may be indicative of an amount of data which may be transferred at the TBA bit rate. As data is transferred at the TBA bit rate, the TBA may be reduced accordingly.

When the TBA is reduced to zero, the TBA may be considered exhausted, at which point the GFBR policy may be returned to.

The TBA may have a maximum size equal to the maximum burst size. In some examples, the TBA may recover at a predefined amount of data per unit time. For instance, the TBA may recover at the TBA recovery speed. The TBA may only recover whilst the flow is scheduled with the GFBR policy. In other examples, the TBA may be reset after a predefined amount of time since the flow was last scheduled with the TBA bit rate. For instance, the TBA may be reset after the TBA burst recovery time. The maximum burst size, rate of recovery and/or the predefined amount of time may be provided in the TBA information.

As such, responsive to the occurrence of a traffic burst event, the network may be configured to schedule a flow with a bit rate which violates the GFBR for a limited amount of data/traffic and/or time. In some examples, a predefined QoS may provide the TBA information to a scheduler to enable the scheduler to provide this functionality. For instance, various 5QI definitions described in "TS 23.501 System architecture for the 5G system" may be supplemented and/or modified to include the TBA information.

In some examples, the TBA bit rate is provided to the scheduler. For instance, the TBA bit rate may be signalled to the scheduler by default or set values in an assigned QoS. Additionally or alternatively, the TBA bit rate may be computed by the scheduler. For instance, the TBA bitrate may be computed by multiplying the GFBR by a constant term. The constant term may depend on the type of flow being scheduled. For instance, the constant term may be provided in the TBA information and/or in the assigned QoS.

The scheduler may allocate resources and/or schedule bit rates to flows based on priority measures and/or priority indexes associated with a QoS. As an example, at a given scheduler there may be many flows with something to transmit. The scheduler may then sort the active flows based on a priority measure (which may be determined by the scheduler) and assign resources to the users with the highest priority measure.

A priority index associated with a QoS is a signal that the scheduler may use to determine these scheduling priority measures. Determination of the scheduling priority measures may also be based on other information in addition to priority indexes, for instance channel quality. Typically, if a flow has a higher priority index in the QoS profile, that flow will have (or be biased to have) a higher priority measure during scheduling. This may be the case at least until the flow's allowance is available (e.g. until its bit rate is below the GFBR, until its TBA is available, etc.).

In some examples, the scheduling operations described herein may be modified to allow one or more high layer procedures (e.g. the MAC layer and/or the SDAP layer) to modify the current TBA based on context information. The context information may include, for instance, the current channel condition or its predicted future realizations. For instance, the TBA may be modified by increasing its allowance in case of a favourable channel condition or in proximity of a known coverage hole. Additionally or alternatively, the context information may indicate occurrence or non-occurrence of a traffic burst event. In this way, or otherwise, a traffic burst at a higher bit rate (e.g. the TBA bit rate) may be triggered in response to certain context information. For instance, a traffic burst event may be triggered when the context information indicates that the context of the recipient of the burst (e.g. a UE) is expected to become less favourable, e.g. due to coverage holes or interference bursts.

As an example, a signal to fully restore the TBA or to increase the TBA by a percentage of its total maximum size may be provided in response to certain context information being received. The context information may indicate, for instance, a favourable channel condition or proximity to a known coverage hole.

In this way, a minimum streaming QoS may be provided in less favourable contexts, such as coverage holes, interference bursts, etc. Furthermore, an adaptive video streaming application may be allowed to buffer more data as a result of modification of the TBA or scheduling of a traffic burst at a higher bit rate in anticipation of an expected future reduction in available possible bit rate. As such, the adaptive video streaming may be supported even if connectivity is temporarily hindered, e.g. for a few seconds.

An example of techniques for buffering data based on context information is described in "Context-aware resource allocation to improve the quality of service of heterogeneous traffic.", Proebster, Magnus, Matthias Kaschub, and Stefan Valentin.

Figure 4:
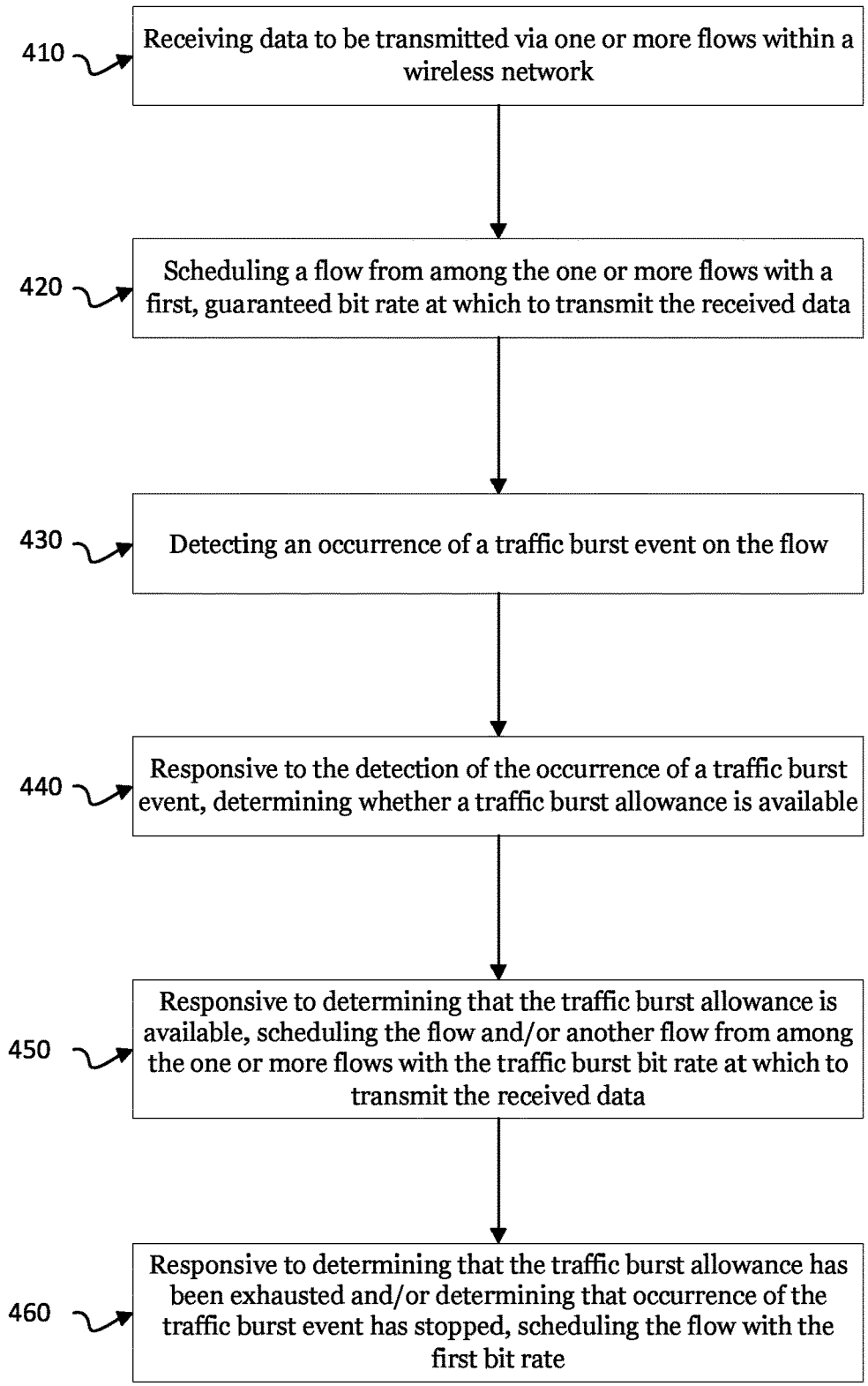
FIG. 4 is a flow diagram showing operations that may be performed in various examples of the described technology.

FIG. 4 is a flow diagram showing operations that may be performed in various examples of the described technology. Some or all of the operations shown in FIG. 4 may be performed by a scheduler, for instance a MAC scheduler or a SDAP scheduler. In some examples, the scheduler may be implemented on one or more apparatus, for instance, a base station of a telecommunications network.

Although some example operations may be described with respect to one or more particular types of flow, it will be appreciated that these operations may be performed with various other types of flows (e.g. but not limited to QoS flows, active users, Data Radio Bearers (DRB), and/or logical channels (LCH)).

As shown in FIG. 4, operation 410 may comprise receiving data to be transmitted via and/or to one or more flows within a wireless network.

Operation 420 may comprise scheduling a flow from among the one or more flows with a first bit rate at which to transmit the received data. The first bit rate may be indicated by an assigned quality of service QoS for the flow. For instance, the first bit rate may be a guaranteed flow bit rate (GFBR). Scheduling a flow with the first bit rate may comprise transmitting the received data (or at least part of the received data) with the flow at the first bit rate.

Operation 430 may comprise detecting an occurrence of a traffic burst event on the flow. The traffic burst event may be, for instance, an initial burst of data to quickly fill a buffer to a certain level during adaptive video streaming.

In some examples, detecting the occurrence of the traffic burst event on the flow may be based on receipt of a traffic burst signal flag. The traffic burst signal flag may be indicative of the received data being associated with a traffic burst event. The traffic burst signal flag may be communicated by the flow.

Additionally or alternatively, in some examples, an input buffer rate of the received data may be tracked. For instance, tracking the input buffer rate of the received data may comprise exponential smoothing. In such examples, detecting the occurrence of the traffic burst event on the flow may be based on determining that the tracked input buffer rate is above a predefined threshold.

Additionally or alternatively, detecting the occurrence of the traffic burst event on the flow may be based at least in part on determining that transmission violates the first bit rate. For instance, this may be based on determining that there is no credit associated with transmission at the first bit rate according to the assigned quality of service.

Credit as described throughout the specification may, for instance, be implemented as tokens in one or more token buckets, as described below. Although various examples are described which involve credit and/or token buckets, it will be appreciated that the technology described herein is not limited to such examples, and various other examples may not involve credit and/or token buckets.

Credit may be indicative of an amount of data which can be sent at a given bit rate. As such, a lack of credit associated with transmission at the first bit rate may indicate that there is no further capacity for transmission at the first bit rate. Put another way, a detection that no credit (or negative credit) is currently associated with transmission at the first bit rate according to the assigned quality of service may, in some examples, be considered a traffic burst event.

Operation 440 may comprise, responsive to the detection of the occurrence of a traffic burst event, determining whether a traffic burst allowance (TBA) is available. The traffic burst allowance may indicate that an amount of data can be transmitted at a traffic burst bit rate. A maximum size of the traffic burst allowance may be indicated (or signalled) by received traffic burst allowance information.

In some examples, determining that the traffic burst allowance is available may be based on determining that there is credit associated with the traffic burst allowance. Additionally or alternatively, determining that the traffic burst allowance is exhausted may be based on determining that there is no credit (or negative credit) associated with the traffic burst allowance. In such examples, credit associated with the traffic burst allowance may be indicative of an amount of data which can be transmitted at the traffic burst bit rate before the traffic burst allowance is exhausted.

Operation 450 may comprise, responsive to determining that the traffic burst allowance is available, scheduling the flow and/or another flow from among the one or more flows with the traffic burst bit rate (also referred to as the TBA bit rate) at which to transmit the received data. The traffic burst bit rate may be greater than the first bit rate. The traffic burst bit rate may be indicated (or signalled) by received traffic burst allowance information.

In some examples, scheduling the flow and/or another flow with the traffic burst bit rate may comprise transmitting at least some of the received data via and/or to the flow and/or the another flow at the traffic burst bit rate. Scheduling a flow with the traffic burst bit rate may also or alternatively comprise assigning the flow with a high priority measure. Scheduling a flow with the first bit rate (i.e. in operations 420 and 460) may comprise transmitting a portion of the received data at the first bit rate. Scheduling a flow with the first bit rate may also or alternatively comprise assigning the flow with a high priority measure.

In some other examples, another flow may be scheduled with the traffic burst.

For instance, the scheduler may be configured to schedule traffic to a plurality of flows. As an example, one of the plurality of flows may have the first bit rate, and another of the plurality of flows may have the traffic burst bit rate. As such, responsive to the detection of the occurrence of a traffic burst event and determining that the traffic burst allowance is available, the other (i.e. the another) flow may be scheduled (i.e. may be selected for transmission of the traffic burst). The other (or another) flow may be described as an auxiliary flow.

Additionally or alternatively, one or more layers (e.g. the SDAP layer) higher in the protocol stack than the scheduler may allocate (or map) traffic from a unique flow to one or more flows which may be handled by the scheduler. As an example, the traffic of a flow (e.g. a HAS flow) may be allocated between a first data radio bearer (DRB) and a second DRB. In this way, the traffic burst may be facilitated by one or more layers higher than the scheduler, thus modifications to scheduler itself may not be needed.

A first flow (e.g. in the example above, the first DRB) may have the first bit rate and a second flow (e.g. in the example above, the second DRB) may have the traffic burst bit rate. Scheduling the flow with the first bit rate may comprise allocating the received data to the first flow. Scheduling the flow with the traffic burst bit rate may comprise allocating the received data to the second flow.

Operation 460 may comprise, responsive to determining that the traffic burst allowance has been exhausted and/or determining that occurrence of the traffic burst event has stopped, scheduling the flow with the first bit rate.

In some examples, determining that the traffic burst allowance has been exhausted may be based on determining that there is no credit (or negative credit) associated with the traffic burst allowance. Examples of situations in which the traffic burst event stops may include the adaptive video stream completing, being paused and/or being interrupted, the input buffer filling to a predefined threshold, etc.

In some examples, responsive to at least one of determining that the burst allowance has been exhausted, determining that the burst allowance is not available, and determining that there is no credit associated with transmission at the traffic burst bit rate, transmission at the traffic burst bit rate may be bypassed. In other words, it may be determined not to schedule the flow and/or another flow within the wireless network with the traffic burst bit rate. In addition or alternatively, the flow may be assigned with a low priority. A lack of credit (or a negative credit) associated with transmission at the traffic burst bit rate may indicate that there is no further capacity for transmission at the traffic burst bit rate. In other words, a lack of credit associated with transmission at the traffic burst bit rate may indicate that the rate of transmitting data in a particular time transmission interval, or otherwise, violates the traffic burst bit rate, and/or that further transmission of data in a particular time transmission interval would violate the traffic burst bit rate.

In some examples, credit may be added, iteratively for plural time transmission intervals, for at least one of: credit associated with transmission at the first bit rate, credit associated with the traffic burst allowance, and credit associated with transmission at the traffic burst bit rate.

For instance, credit associated with transmission at the first bit rate may be added based on an amount of data dependent on the time transmission interval and the first bit rate. For instance, the credit associated with transmission at the first bit rate that is added may be proportional to the time transmission interval multiplied by the first bit rate.

For instance, credit associated with the traffic burst allowance may be added based on the amount of data which the TBA has recovered over the time transmission interval. This may be based on the burst recovery time and/or the TBA recovery speed. For instance, the added credit may be based on the maximum amount of data which can be transmitted at the TBA bit rate before the burst allowance is exhausted (which may be referred to as the TBA size), the burst recovery time, and the time transmission interval. Specifically, then added credit may be proportional to the time transmission interval being multiplied by the TBA size divided by the burst recovery time. Additionally or alternatively, the credit associated with the traffic burst allowance may be based on the amount of time since the last use of the TBA bit rate. For instance, if the amount of time since the last use of the TBA bit rate has passed, the amount of credit added may be proportional or equal to the maximum burst size.

For instance, credit associated with transmission at the traffic burst bit rate may be added based on an amount of data dependent on the time transmission interval and the traffic burst bit rate. For instance, the credit associated with transmission at the traffic burst bit rate that is added may be proportional to the time transmission interval multiplied by the traffic burst bit rate.

In some examples, credit may be removed, iteratively for plural time transmission intervals, for at least one of: credit associated with transmission at the first bit rate, credit associated with the traffic burst allowance, and credit associated with transmission at the traffic burst bit rate.

For instance, credit associated with transmission at the first bit rate that is removed may be based on the amount of received data transmitted at the first bit rate. For instance, the credit associated with transmission at the first bit rate that is removed may be proportional to the amount of received data transmitted at the first bit rate.

For instance, credit associated with the traffic burst allowance and/or credit associated with transmission at the burst bit rate that is removed may be based on the amount of received data transmitted at the traffic burst bit rate. For instance, credit associated with the traffic burst allowance and/or credit associated with transmission at the burst bit rate that is removed may be proportional to the amount of received data transmitted at the traffic burst bit rate.

In some examples, scheduling operations may be performed by a scheduler, for instance, a MAC scheduler. The scheduler may schedule a flow based on a token bucket mechanism. In this way, the scheduler can enforce, for instance, guaranteed flow bit rates (GFBRs). In 5G networks this can correspond to both guaranteed bit rates (GBR) and non-GBR GFBR requirements. The scheduler may track a token bucket for every bit rate constraint. As such, the scheduler may enforce the GFBR with hard-priority logics.

In scheduling techniques involving hard priorities, a higher priority user may be provided with all the resources needed to fully satisfy its needs over a low priority user. This may be the case when, for instance, two users are scheduled with GFBR, where one of the users has positive credit (and is thus assigned a high priority) and the other has negative credit (and is thus assigned a low priority).

Figure 5:
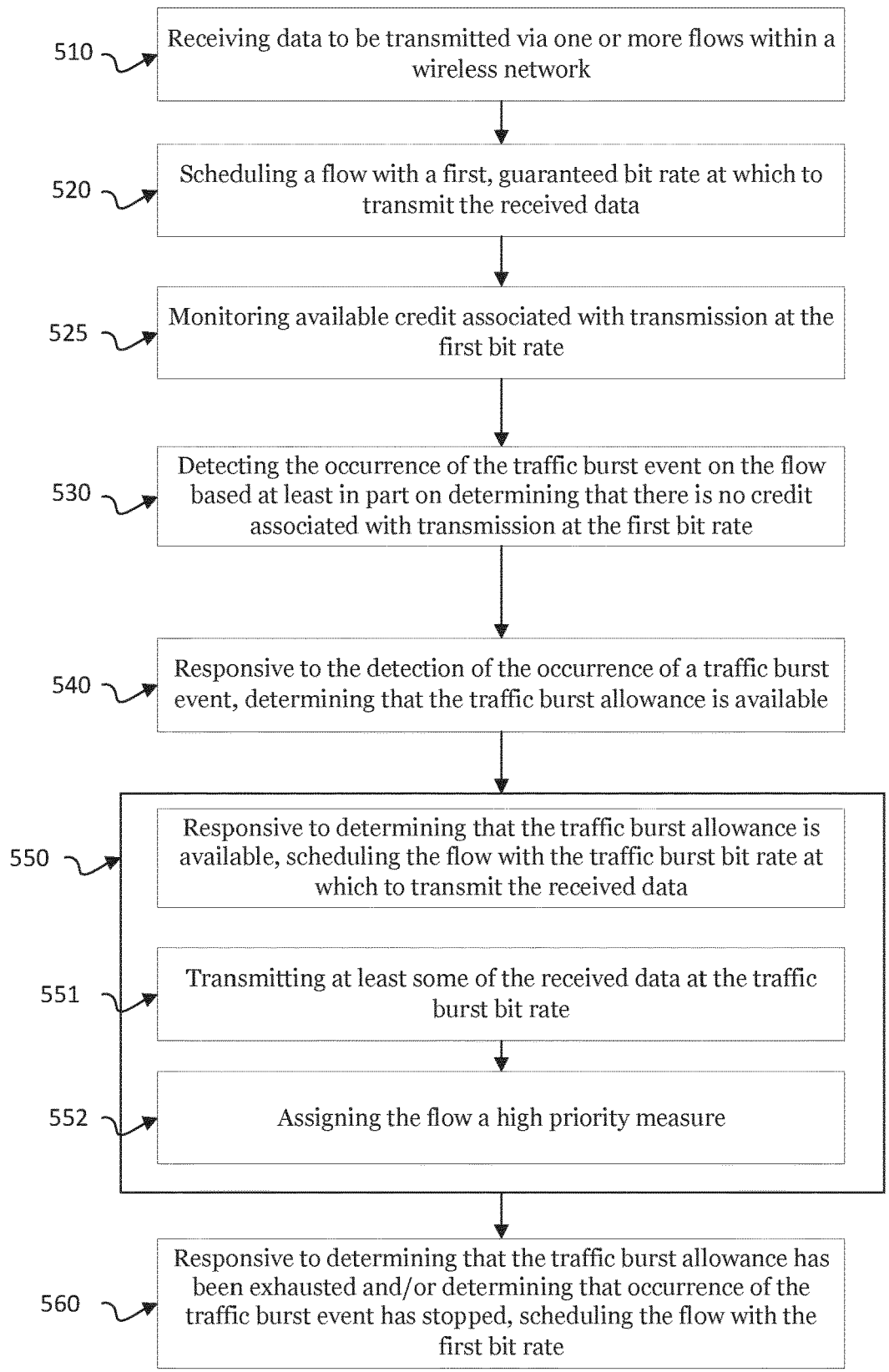
FIG. 5 is a flow diagram showing an example of the operations illustrated in FIG. 4.

FIG. 5 is a flow diagram showing an example of the operations illustrated in FIG. 4. In particular, the scheduling operations illustrated in FIG. 5 may be performed by a scheduler (e.g. a MAC scheduler) which may schedule a flow based on a token bucket mechanism. For brevity, a detailed description of operations already described in relation to FIG. 4 will not be repeated here.

As shown in FIG. 5, operation 510 may comprise receiving data to be transmitted within a wireless network.

Operation 520 may comprise scheduling a flow with a first bit rate at which to transmit the received data. For instance, operation 520 may be similar to operation 420 as described in relation to FIG. 4.

Operation 525 may comprise monitoring available credit associated with transmission at the first bit rate. In some examples, available credit associated with the traffic burst allowance and/or available credit associated with transmission at the traffic burst bit rate may also be monitored.

Operation 530 may comprise detecting the occurrence of the traffic burst event on the flow based at least in part on determining that there is no credit associated with transmission at the first bit rate. In some examples, detecting the occurrence of the traffic burst event on the flow may be additionally or alternatively based on receipt of a traffic burst signal flag. The traffic burst signal flag may be indicative of the received data being associated with a traffic burst event. The traffic burst signal flag may be communicated by the flow.

Additionally or alternatively, in some examples, an input buffer rate of the received data may be tracked. For instance, tracking the input buffer rate of the received data may comprise exponential smoothing. In such examples, detecting the occurrence of the traffic burst event on the flow may be additionally or alternatively based on determining that the tracked input buffer rate is above a predefined threshold.

Operation 540 may comprise, responsive to the detection of the occurrence of a traffic burst event, determining that the traffic burst allowance is available. For instance, the determination may be based on determining that there is credit associated with transmission the traffic burst allowance. For instance, operation 540 may be similar to operation 440 as described in relation to FIG. 4.

Operation 550 may comprise responsive to determining that the traffic burst allowance is available, scheduling the flow with the traffic burst bit rate at which to transmit the received data. For instance, operation 550 may be similar to operation 450 as described in relation to FIG. 4. Operation 550 may comprise operations 551 and 552.

Operation 551 may comprise transmitting at least some of the received data at the traffic burst bit rate.

Operation 552 may comprise assigning the data transmitted at the traffic burst bit rate with a high priority.

Operation 560 may comprise responsive to determining that the traffic burst allowance has been exhausted and/or determining that occurrence of the traffic burst event has stopped, scheduling the flow with the first bit rate. For instance, operation 560 may be similar to operation 460 as described in relation to FIG. 4.

Scheduling operations illustrated in FIG. 5 may be described as follows:

For a given flow i with GFBR $\beta_i$, a token bucket $T_i$ is initialized when the flow comes to the system. Then, assuming updates every Time Transmission Interval (TTI), the token is updated as follows:

$$T_i \leftarrow T_i + \beta_i T - R$$

Where

R is the amount of traffic successfully transmitted (at a particular bit rate or at any bit rate) by the flow in the last TTI, T is the TTI duration, hence $\beta_i T$ is the entitled amount of traffic in one TTI.

The size of the token bucket $T_i$ may be lower and upper capped to avoid undesired behaviour when the input buffer is empty or the system is empty for too long time. For instance, this may prevent accidentally allowing the flow to obtain higher bit rates than permitted.

The scheduling operation may further include determining, when the flows are sorted for scheduling, whether the token bucket is positive and whether there is credit for the considered flow at the GFBR as a result. When there is credit for a flow at the GFBR, the flow may be scheduled with a high priority measure, otherwise a lower priority measure may be assigned. Additionally or alternatively, when there is credit for a flow at the GFBR, the flow may be scheduled with the GFBR and/or data may be transmitted with the flow.

This framework can be expanded to facilitate serving a traffic burst. Serving a traffic burst may be enforced by a first token bucket $T_i$ associated with the GFBR, and a second token bucket $T_i'$ associated with the burst allowance (the TBA). In some examples, serving a traffic burst may also be enforced by a third token bucket $T_i''$ associated with the TBA bit rate.

An example of scheduling operations based on the first, second and third token buckets may be as follows:

$T_i$ with $\beta_i$=GFBR and arbitrary initial value greater or equal than zero (as before for GFBR).

$T_i'$ with $\beta''_i$=maximum burst size/recovery time, with an initial value equal to T(0)=maximum burst size, minimum cap equal to 0, and maximum cap equal to maximum burst size.

$T_i''$ with $\beta'_i$=TBA bit rate, with initial value equal to 0, and the maximum value capped at a small arbitrary value.

The GFBR token bucket $T_i$ may be updated as previously described. The TBA bit rate token bucket $T_i''$ may be updated in the same way as the GFBR token bucket, but with $\beta_i''$=TBA bit rate. The following procedure may be applied to assign high or low priority to the flow and to update the burst allowance token bucket $T_i'$.

---

If $T_i < 0$ (i.e. there is no credit because the requested bit rate violates GFBR)
    if $T_i' < 0$ (i.e. the burst allowance is exhausted)
        Assign Low Priority (violating GFBR and TBA),
        $T_i' \leftarrow T_i' + \beta_i'T$
    else if $T_i'' \geq 0$ (i.e. the burst allowance is not exhausted and credit is left for TBA bit rate)
        Assign High Priority (violating GFBR, using TBA),
        $T_i' \leftarrow T_i' + \beta_i'T - R$
    else (i.e. there is no credit because the requested bit rate violates TBA bit rate)
        Assign Low Priority (violating GFBR, and TBA)
        $T_i' \leftarrow T_i' + \beta_i'T$
else
    Assign High Priority (using GFBR)
    $T_i' \leftarrow T_i' + \beta_i'T$

---

In this way, the scheduler can limit the maximum bit rate of the flow with $T_i''$, and keep track of the burst allowance with $T_i'$, making use of it only when there is not enough credit in the GFBR token bucket $T_i$. As such, since the token buckets may be properly initialized and/or may recharge during network down-times, the scheduler may facilitate a TBA for initial and recovery bursts when no traffic has been transmitted for some time.

In some situations, an aggressive implementation of an adaptive video streaming flow may always be request and/or demand maximum throughput. As such, the scheduling operations described above may be modified to prevent the flow from consuming both the GFBR and TBA with steady traffic thereby achieving a steady rate of GFBR+$\beta_i'$.

As such, the scheduler may be configured to determine the presence of a flag indicating that a data packet belongs to a traffic burst. In order to enable this, types of flows DRBs, such as those associated with adaptive video streaming and the like, may communicate the flag if a packet belongs to a traffic burst.

An example of scheduling operations modified as such, may be largely similar to those previously described, and may be as follows:

---

If $T_i < 0$
    if $T_i' \leq 0$ OR TBA flag == False
        Assign Low Priority (violating GFBR and TBA),
        $T_i' \leftarrow T_i' + \beta_i'T$
    else if $T_i'' \geq 0$
        Assign High Priority (violating GFBR, using TBA),
        $T_i' \leftarrow T_i' + \beta_i'T - R$
else
    Assign Low Priority (violating GFBR, and TBA)
    $T_i' \leftarrow T_i' + \beta_i'T$
else
    Assign High Priority (using GFBR)
    $T_i' \leftarrow T_i' + \beta_i'T$

---

In this way, a flow may be prevented from consuming the TBA allowance during steady rate operations (e.g. at GFBR).

In some situations, comparison of threshold-based tokens with token counters may not be possible. For instance, this may be because of the soft approach of the scheduling algorithm in situations where the MAC scheduling involves soft-priority GFBR enforcement in long-term periods.

In scheduling techniques involving a soft priorities, as an example, if two flows have different soft priorities, their credit tokens may offset the priority measures in the scheduler in a numerical way. This means that the user with the higher credit token would typically get more resources than the other user, but they may not always get all of requested resources (which they may do under hard priority mechanisms).

This may happen because a soft-priority may just offset the priority measure in the scheduler, and the priority measure in the scheduler may ultimately also depend on other factors. As a result, the scheduler may bring to allocations of resources/scheduling also to the lower priority user. For instance, this may be the case when the lower priority user has a very good channel and/or when the higher priority user has a very bad channel.

An example of scheduling techniques which may be used in 5G MAC scheduling is described in "Satisfying network slicing constraints via 5G MAC scheduling.", Mandelli, Silvio, et al.

As such, an auxiliary flow with a guaranteed bit rate equal to the TBA bit rate may be used. Specifically, the scheduler may redirect traffic bursts to the auxiliary flow.

In some examples, scheduling the flow with the first bit rate according to the assigned QoS may comprise scheduling transmission of the received data with a first flow. The first flow may have the first bit rate according to the assigned QoS. Additionally or alternatively, scheduling the flow with the traffic burst bit rate may comprise redirecting the received data to an auxiliary flow and/or scheduling transmission of the received data with an auxiliary flow. The auxiliary flow may have the traffic burst bit rate.

Figure 6:
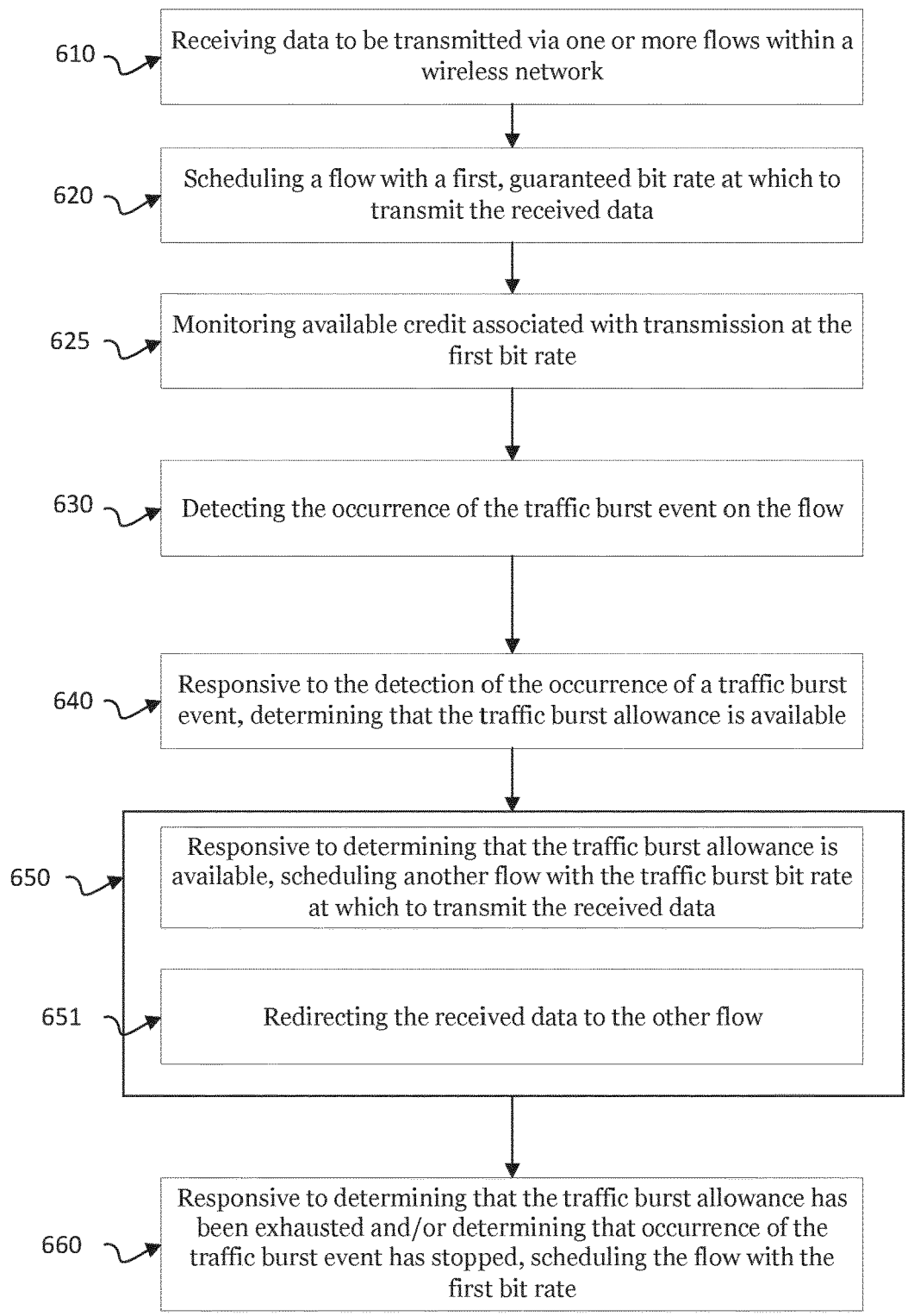
FIG. 6 is a flow diagram showing another example of the operations illustrated in FIG. 4.

FIG. 6 is a flow diagram showing another example of the operations illustrated in FIG. 4. In particular the scheduling operations illustrated in FIG. 6 may relate to redirecting traffic bursts to an auxiliary flow. For brevity, a detailed description of operations already described in relation to FIG. 4 will not be repeated here.

Operation 610 may comprise receiving data to be transmitted within a wireless network.

Operation 620 may comprise scheduling an flow with a first bit rate at which to transmit the received data. For instance, operation 420 may be similar to operation 420 as described in relation to FIG. 4.

Operation 625 may comprise monitoring available credit associated with transmission at the first bit rate. In some examples, available credit associated with the traffic burst allowance and/or available credit associated with transmission at the traffic burst bit rate may also be monitored.

Operation 630 may comprise detecting the occurrence of the traffic burst event on the flow. In some examples, detecting the occurrence of the traffic burst event on the flow may be based at least in part on determining that there is no credit associated with transmission at the first bit rate according to the assigned quality of service.

Additionally or alternatively, detecting the occurrence of the traffic burst event on the flow may be based on receipt of a traffic burst signal flag. The traffic burst signal flag may be indicative of the received data being associated with a traffic burst event. The traffic burst signal flag may be communicated by the flow.

Additionally or alternatively, in some examples, an input buffer rate of the received data may be tracked. For instance, tracking the input buffer rate of the received data may comprise exponential smoothing. In such examples, detecting the occurrence of the traffic burst event on the flow may be based on determining that the tracked input buffer rate is above a predefined threshold.

Operation 640 may comprise responsive to the detection of the occurrence of a traffic burst event, determining that the traffic burst allowance is available. For instance, the determination may be based on determining that there is credit associated with the traffic burst allowance. For instance, operation 540 may be similar to operation 440 as described in relation to FIG. 4.

Operation 650 may comprise responsive to determining that the traffic burst allowance is available, scheduling another flow (i.e. the other flow, which may be the auxiliary flow) with the traffic burst bit rate at which to transmit the received data. Operation 650 may comprise operation 651. For instance, operation 650 may be similar to operation 450 as described in relation to FIG. 4.

Operation 651 may comprise redirecting the received data to the other flow.

Operation 660 may comprise responsive to determining that the traffic burst allowance has been exhausted and/or determining that occurrence of the traffic burst event has stopped, scheduling the flow with the first bit rate. For instance, operation 660 may be similar to operation 460 as described in relation to FIG. 4.

In the scheduling operations illustrated in FIG. 6, the second token bucket $T_i'$ may still be used to track the TBA. As such, it may be initialized as described previously, and updated as follows:

if a traffic burst event is detected AND $T_i'>0$
  Schedule the packet with the auxiliary flow, $$T_i' \leftarrow T_i' + \beta_i' T - R$$

else
  Schedule the packet with the GFBR flow, $$T_i' \leftarrow T_i' + \beta_i' T$$

Similarly to above, in some examples, the scheduler may be configured to determine the presence of a flag indicating that a data packet belongs to a traffic burst. In such examples, responsive to determining that the flag is present, the scheduler may detect the occurrence of a traffic burst event.

In some other examples, the scheduler may track the input buffer rate. For instance, the scheduler may track the input buffer rate using exponential smoothing. The scheduler may detect the occurrence of a traffic burst event when the tracked rate is above a threshold. The threshold may depend on, for instance, the flow's assigned QoS. In some examples, the scheduler may be configured to only detect traffic burst events at the beginning of a stream.

In this way, scheduling the flow with the TBA bit rate may be facilitated even in situations where, for instance, the scheduling uses soft priority GFBR enforcement.

In some examples, the scheduling operations may not be performed by a lower level scheduler (e.g. a MAC scheduler). For instance, the scheduling operations may be performed by schedulers located in one or more layers of the protocol stack higher than a lower level scheduler (e.g. a MAC scheduler). As an example, the scheduling operations may be performed by schedulers located in the service data adaptation protocol (SDAP) layer.

Higher-layer schedulers may facilitate scheduling traffic from a unique flow by splitting the traffic between two or more flows, as described above. For instance, a first DRB may have the normal GFBR and a second DRB may have the TBA bit rate. The second DRB may thus only be used when traffic bursts are served. In this way, scheduling the flow with the TBA bit rate can be facilitated in a way transparent for a lower level scheduler (e.g. a MAC scheduler), and thus modifications to standard signals may not be required.

As an example, the Service Data Adaptation Protocol (SDAP) can map traffic of a unique QoS flow (e.g. a unique HAS QoS flow) to two different DRBs. One DRB may have the typical GFBR, while the second may have a higher guaranteed bit rate corresponding to TBA bit rate. The SDAP (or any corresponding high-layer managing this split) may initialize and use the second token bucket $T_i'$ to split the HAS flow's traffic to the two DRBs.

In this way, any underlying lower level scheduling (e.g. MAC scheduling) with GFBR capabilities may be able to serve the TBA+GFBR flow QoS without modification.

Figure 7:
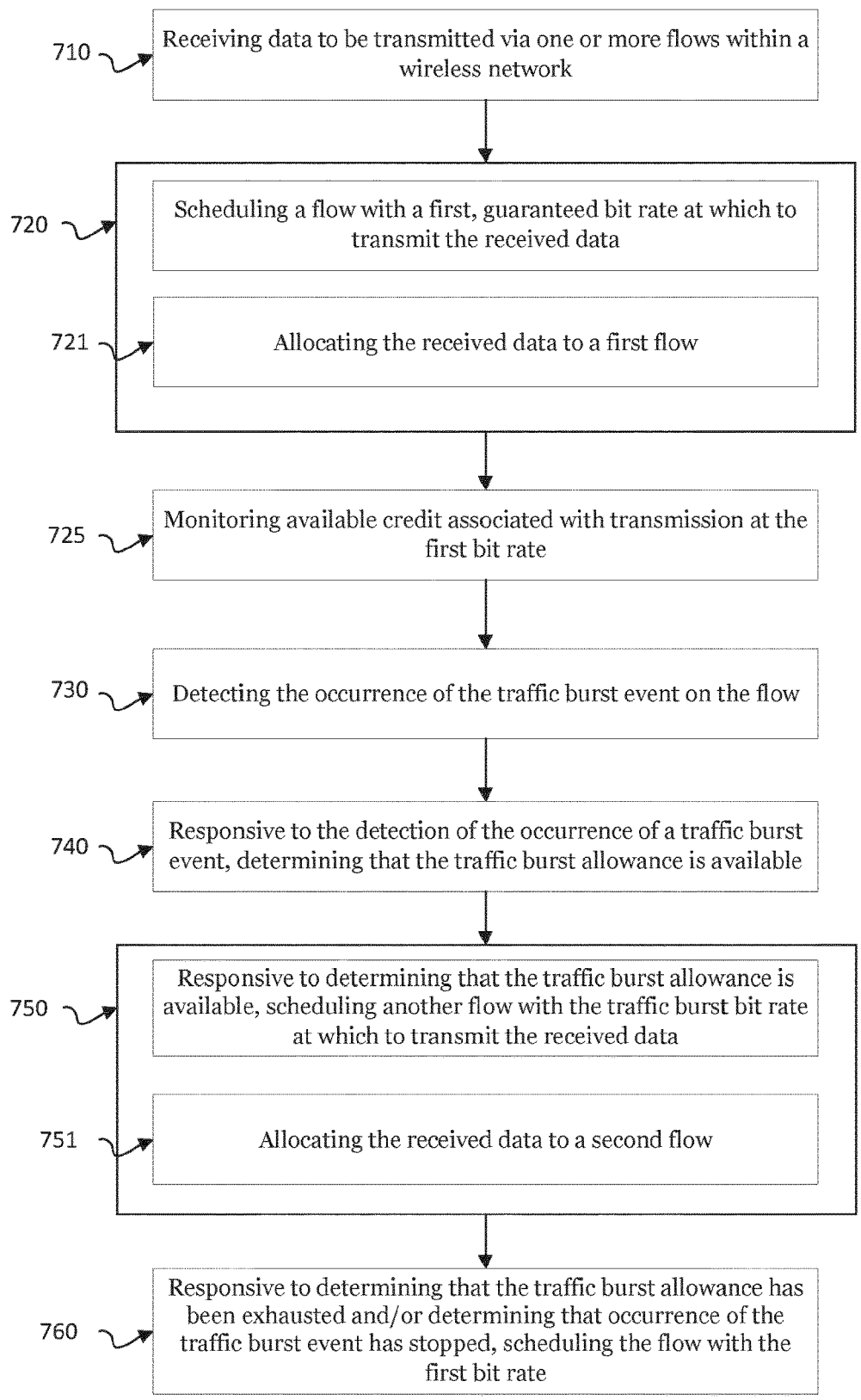
FIG. 7 is a flow diagram showing another example of the operations illustrated in FIG. 4.

FIG. 7 is a flow diagram showing another example of the operations illustrated in FIG. 4. In particular, the scheduling operations illustrated in FIG. 7 may be performed by a higher-layer scheduler. For instance, the scheduling operations illustrated in FIG. 7 may be performed by one or more layers higher than the MAC layer. For brevity, a detailed description of operations already described in relation to FIG. 4 will not be repeated here.

As illustrated in FIG. 7, in some examples, traffic of a unique flow may be allocated (and/or mapped) to a first flow and a second flow. The first flow may have the first bit rate according to the assigned QoS and the second flow may have the traffic burst first bit rate. Scheduling the flow with the first bit rate according to the assigned QoS may comprise allocating the received data to the first flow and/or scheduling transmission of data with the first flow. Scheduling the other (e.g. the another) flow with the traffic burst first bit rate may comprise allocating the received data to the second flow and/or scheduling transmission of data with the second flow.

As shown in FIG. 7, operation 710 may comprise receiving data to be transmitted by one or more flows within a wireless network. The received data may be associated with a unique flow. For instance, the unique flow may be a unique QoS flow (e.g. but not limited to a HAS QoS flow).

Operation 720 may comprise scheduling a flow with a first bit rate at which to transmit the received data. Operation 720 may comprise operation 721. For instance, operation 720 may be similar to operation 420 as described in relation to FIG. 4.

Operation 721 may comprise allocating the received data to a first flow. The first flow may have the first bit rate. For instance, the first flow may be a first DRB.

Operation 725 may comprise monitoring available credit associated with transmission at the first bit rate. In some examples, available credit associated with the traffic burst allowance and/or available credit associated with transmission at the traffic burst bit rate may also be monitored.

Operation 730 may comprise detecting the occurrence of the traffic burst event on the flow. In some examples, detecting the occurrence of the traffic burst event on the flow may be based at least in part on determining that there is no credit associated with transmission at the first bit rate according to the assigned quality of service.

Additionally or alternatively, detecting the occurrence of the traffic burst event on the flow may be based on receipt of a traffic burst signal flag. The traffic burst signal flag may be indicative of the received data being associated with a traffic burst event. The traffic burst signal flag may be communicated by the flow.

Additionally or alternatively, in some examples, an input buffer rate of the received data may be tracked. For instance, tracking the input buffer rate of the received data may comprise exponential smoothing. In such examples, detecting the occurrence of the traffic burst event on the flow may be based on determining that the tracked input buffer rate is above a predefined threshold.

Operation 740 may comprise responsive to the detection of the occurrence of a traffic burst event, determining that the traffic burst allowance is available. For instance, the determination may be based on determining that there is credit associated with the traffic burst allowance. For instance, operation 740 may be similar to operation 440 as described in relation to FIG. 4.

Operation 750 may comprise responsive to determining that the traffic burst allowance is available, scheduling the other (or the another) flow with the traffic burst bit rate at which to transmit the received data. Operation 750 may comprise operation 751. For instance, operation 750 may be similar to operation 450 as described in relation to FIG. 4.

Operation 751 may comprise allocating the received data to a second flow. The second flow may have the traffic burst bit rate. For instance, the second flow may be a second DRB.

Operation 760 may comprise responsive to determining that the traffic burst allowance has been exhausted and/or determining that occurrence of the traffic burst event has stopped, scheduling the flow with the first bit rate. For instance, operation 760 may be similar to operation 460 as described in relation to FIG. 4.

An example of the scheduling operations illustrated in FIG. 7 in which traffic may be split between the first and second flows may be described as follows:

if a traffic burst event is detected AND $T_i'>0$
  Allocate the traffic to the flow with TBA bit rate, $$T_i' \leftarrow T_i' + \beta_i'T - R$$

else
  Allocate the traffic to the flow with the normal GFBR, $$T_i' \leftarrow T_i' + \beta_i'T$$

Detection of the traffic burst event may be performed in a similar manner as described above in relation to any one of FIGS. 4 to 6, modified as necessary for the higher level scheduler.

In this way, scheduling the flow with the TBA bit rate can be facilitated in a way transparent for a lower level scheduler (e.g. a MAC scheduler), and modifications to standard signals may not be required. In addition, any underlying lower level scheduling (e.g. MAC scheduling) with GFBR capabilities may be able to serve the TBA+GFBR QoS without modification.

Figure 8:
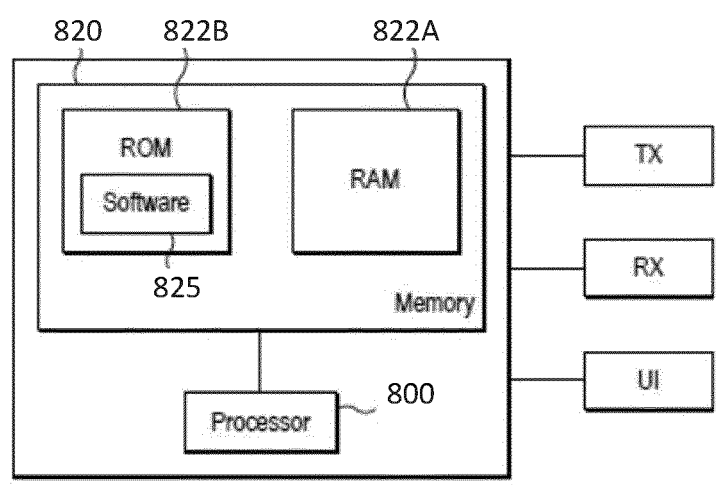
FIG. 8 is a schematic view of an example apparatus which may be configured to perform various operations described herein.

FIG. 8 is a schematic view of an example apparatus which may be configured to perform various operations described herein. For instance, the apparatus may implement all or part of the protocol stack. Specifically, in some examples, the apparatus may implement the lower level scheduler (e.g. MAC scheduler) and/or the higher level scheduler (e.g. in the SDAP layer). Additionally or alternatively, one or more layers in the protocol stack may be implemented by another apparatus. In some examples, for instance those using 5G technologies, the apparatus may form part of, or comprise, a base station in a telecommunications network.

The apparatus comprises at least one processor 800 and at least one memory 820 directly or closely connected or coupled to the processor. The memory 820 may comprise at least one random access memory (RAM) 822A and at least one read-only memory (ROM) 822B. Computer program code (software) 825 may be stored in the ROM 822B. The apparatus may be connected to a transmitter path and a receiver path in order to obtain respective signals comprising the aforementioned data. The apparatus may be connected with a user interface (UI) for instructing the apparatus and/or for outputting data. The at least one processor 800 with the at least one memory 820 and the computer program code may be arranged to cause the apparatus to at least perform methods described herein.

The processor 800 may be a microprocessor, plural microprocessors, a control, or plural microcontrollers.

The memory 820 may take any suitable form.

The transmitter path and receiver path between any of the described apparatus may be established using a transceiver module which may be arranged suitable for any form of radio communications, for example cellular radio communications according to 2G, 3G, 4G, 5G or future-generation standards.

Figure 9:
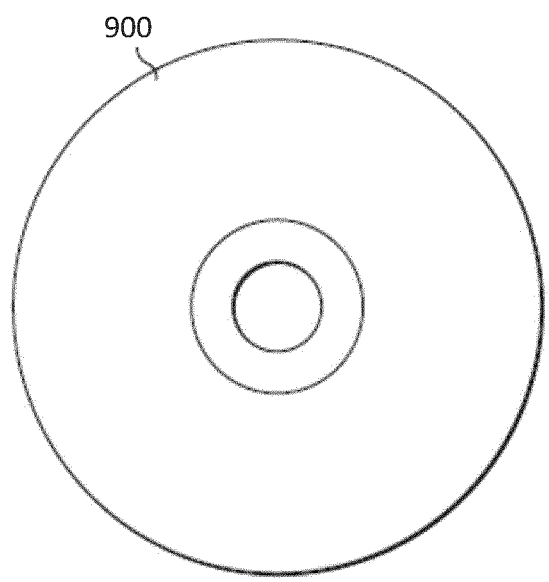
FIG. 9 is a non-transitory medium which may be used to store computer-readable code which, when executed by one or more processors of an apparatus, may cause performance of various operations described herein.

FIG. 9 shows a non-transitory media 900 according to some embodiments. The non-transitory media 900 is a computer readable storage medium. It may be e.g. a CD, a DVD, a USB stick, a blue ray disk, etc. The non-transitory media 900 stores computer program code causing an apparatus to perform operations described above when executed by a processor such as processor 800 of FIG. 8.

Any mentioned apparatus and/or other features of particular mentioned apparatus may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some examples, a particular mentioned apparatus may be pre-programmed with the appropriate software to carry out desired operations, and wherein the appropriate software can be enabled for use by a user downloading a "key", for example, to unlock/enable the software and its associated functionality. Advantages associated with such examples can include a reduced requirement to download data when further functionality is required for a device, and this can be useful in examples where a device is perceived to have sufficient capacity to store such pre-programmed software for functionality that may not be enabled by a user.

Any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

Any "computer" described herein can comprise a collection of one or more individual processors/processing elements that may or may not be located on the same circuit board, or the same region/position of a circuit board or even the same device. In some examples one or more of any mentioned processors may be distributed over a plurality of devices. The same or different processor/processing elements may perform one or more functions described herein.

The term "signalling" may refer to one or more signals transmitted as a series of transmitted and/or received electrical/optical signals. The series of signals may comprise one, two, three, four or even more individual signal components or distinct signals to make up said signalling. Some or all of these individual signals may be transmitted/received by wireless or wired communication simultaneously, in sequence, and/or such that they temporally overlap one another.

With reference to any discussion of any mentioned computer and/or processor and memory (e.g. including ROM, CD-ROM, etc.), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/examples may consist of any such individual feature or combination of features. In view of the foregoing description it will be evident to a person skilled in the art that various modifications may be made within the scope of the disclosure.

While there have been shown and described and pointed out fundamental novel features as applied to examples thereof, it will be understood that various omissions and substitutions and changes in the form and details of the devices and methods described may be made by those skilled in the art without departing from the scope of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or examples may be incorporated in any other disclosed or described or suggested form or example as a general matter of design choice. Furthermore, in the claims means-plus-function clauses are intended to cover the structures described herein as performing the recited function and not only structural equivalents, but also equivalent structures.

The invention claimed is:

1. Apparatus comprising means for:
  detecting an occurrence of a traffic burst event on a flow within a wireless network;
  responsive to the detection of the occurrence of a traffic burst event, determining whether a traffic burst allowance is available;
  responsive to determining that the traffic burst allowance is available, scheduling the flow and/or another flow within the wireless network with a traffic burst bit rate at which to transmit data, the traffic burst bit rate being greater than a first, guaranteed bit rate indicated by an assigned quality of service for the flow; and
  responsive to determining that the traffic burst allowance has been exhausted and/or determining that occurrence of the traffic burst event has stopped, scheduling the flow with the first bit rate.

2. The apparatus of claim 1 comprising means for:
  receiving traffic burst allowance information indicative of a maximum size of an amount of data which can be transmitted at the traffic burst bit rate before the traffic burst allowance is exhausted.

3. The apparatus of claim 1 comprising means for:
  receiving traffic burst allowance information indicative of the traffic burst bit rate, and/or
  calculating the traffic burst bit rate.

4. The apparatus of claim 1 comprising means for:
  receiving traffic burst allowance information indicative of at least one of:
    a recovery time, wherein an amount of data which can be transmitted at the traffic burst bit rate before the traffic burst allowance is exhausted is reset to a maximum value after an amount of time indicated by the recovery time has passed since the traffic burst bit rate was last scheduled,
    a recovery speed, wherein an amount of data which can be transmitted at the traffic burst bit rate before the traffic burst allowance is exhausted recovers at a rate indicated by the recovery speed, and
    a priority index of data transmitted at the traffic burst bit rate, the priority index of data transmitted at the traffic burst bit rate being higher than a priority index for data transmitted at the first bit rate.

5. The apparatus of claim 1, comprising means for:
  monitoring available credit associated with transmission at the first bit rate, wherein detecting the occurrence of the traffic burst event on the flow is based at least in part on determining that there is no credit associated with transmission at the first bit rate, wherein available credit is indicative of an amount of data which can be transmitted at a particular bit rate.

6. The apparatus of claim 1 comprising means for:
  detecting the occurrence of the traffic burst event on the flow based on receipt of a traffic burst signal flag associated with data to be transmitted at the traffic burst bit rate.

7. The apparatus of claim 1 comprising means for:
  tracking an input buffer rate of received data; and
    detecting the occurrence of the traffic burst event on the flow based on determining that the tracked input buffer rate is above a predefined threshold.

8. The apparatus of claim 1, wherein determining that the traffic burst allowance is available is based on determining that there is credit associated with the traffic burst allowance,
  wherein determining that the traffic burst allowance has been exhausted and/or is not available is based on determining that there is no credit associated with the traffic burst allowance, and
  wherein available credit associated with the traffic burst allowance is indicative of an amount of data which can be transmitted at the traffic burst bit rate before the traffic burst allowance is exhausted.

9. The apparatus of claim 8, comprising means for, iteratively for plural time transmission intervals:
adding credit associated with transmission at the traffic burst bit rate and/or the traffic burst allowance based on a duration of a time transmission interval and the traffic burst bit rate; and
removing credit associated with transmission at the traffic burst bit rate and/or the traffic burst allowance based on an amount of data transmitted during the time transmission interval.

10. The apparatus of claim 1, comprising means for, responsive to at least one of determining that the burst allowance has been exhausted, determining that the burst allowance is not available, and determining that the rate of transmitting data violates the traffic burst bit rate:
determining not to schedule the flow and/or another flow within the wireless network with the traffic burst bit rate.

11. The apparatus of claim 1, comprising means for scheduling the another flow with the traffic burst bit rate, wherein scheduling the another flow with the traffic burst bit rate comprises redirecting the data for transmission to the another flow, the another flow having the traffic burst bit rate.

12. The apparatus of claim 11, wherein the scheduling is performed by a MAC scheduler.

13. The apparatus of claim 1, comprising means for scheduling the another flow with the traffic burst bit rate, wherein the data for transmission is associated with a unique flow, and
wherein scheduling the flow with the first bit rate comprises allocating the data to a first flow, and scheduling the another flow with the traffic burst bit rate comprises allocating the data to a second flow, wherein the first flow has the first bit rate and the second flow has the traffic burst bit rate.

14. The apparatus of claim 13, wherein the scheduling is performed by a protocol stack layer higher than a MAC scheduler.

15. The apparatus of claim 1 comprising means for:
receiving context information; and
modifying the traffic burst allowance based on the context information.

16. The apparatus of claim 15, wherein modifying the traffic burst allowance based on the context information comprises at least one of resetting the traffic burst allowance to a maximum traffic burst allowance, and increasing the maximum traffic burst allowance.

17. The apparatus of claim 1, wherein the network is a fixed wireless access network.

18. The apparatus of claim 1 for scheduling transmission of data with an adaptive video streaming flow, wherein the flow, and/or the another flow is an adaptive video streaming flow.

19. Method comprising:
detecting an occurrence of a traffic burst event on a flow within a wireless network;
responsive to the detection of the occurrence of a traffic burst event, determining whether a traffic burst allowance is available;
responsive to determining that the traffic burst allowance is available, scheduling the flow and/or another flow within the wireless network with a traffic burst bit rate at which to transmit data, the traffic burst bit rate being greater than a first, guaranteed bit rate indicated by an assigned quality of service for the flow; and
responsive to determining that the traffic burst allowance has been exhausted and/or determining that occurrence of the traffic burst event has stopped, scheduling the flow with the first bit rate.

20. A computer program product comprising a set of instructions which, when executed on an apparatus, cause the apparatus to:
detect an occurrence of a traffic burst event on a flow within a wireless network,
responsive to the detection of the occurrence of a traffic burst event, determine whether a traffic burst allowance is available,
responsive to determining that the traffic burst allowance is available, schedule the flow and/or another flow within the wireless network with a traffic burst bit rate at which to transmit data, the traffic burst bit rate being greater than a first, guaranteed bit rate indicated by an assigned quality of service for the flow, and
responsive to determining that the traffic burst allowance has been exhausted and/or determining that occurrence of the traffic burst event has stopped, schedule the flow with the first bit rate.

* * * * *